April 25, 1961  C. J. BUSHROD  2,981,783
TUBULAR TYPE PLATES FOR ELECTRIC ACCUMULATORS
Filed May 23, 1958
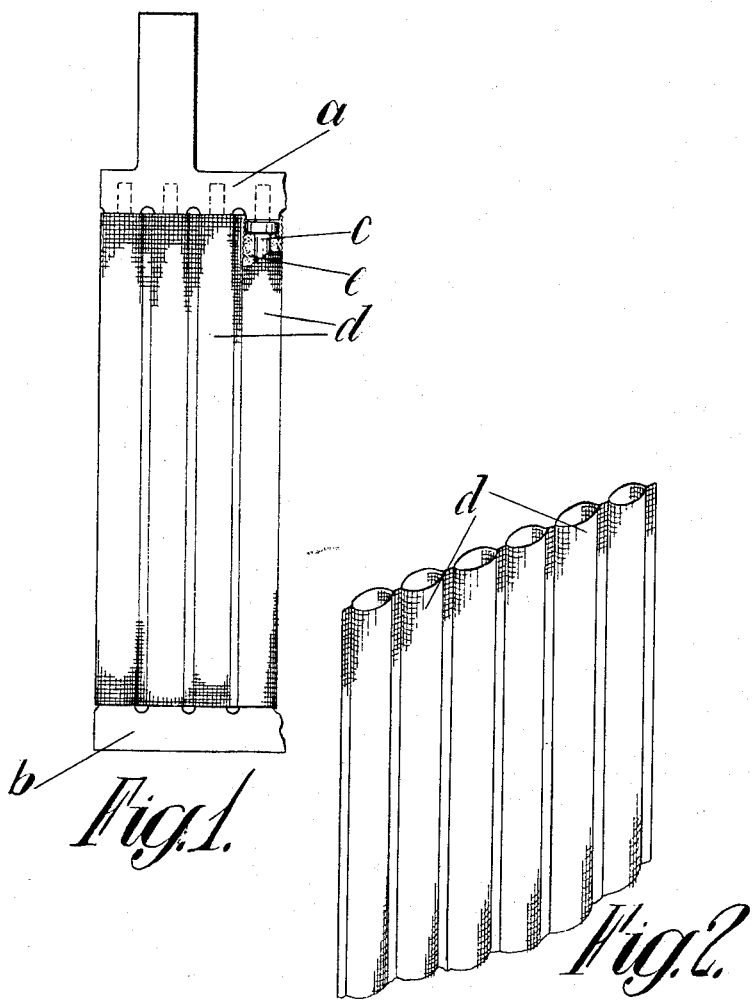
Inventor
C. J. Bushrod

United States Patent Office 2,981,783
Patented Apr. 25, 1961

2,981,783

TUBULAR TYPE PLATES FOR ELECTRIC ACCUMULATORS

Charles James Bushrod, Cheadle, England, assignor to Chloride Batteries Limited, Swinton, near Manchester, England, a British company Filed May 23, 1958, Ser. No. 737,201

6 Claims. (Cl. 136—146)

This invention relates to what are known as tubular type plates for lead-acid electric accumulators. In such plates lead spines extend between top and bottom bars of the plate and the active material around the spines is enclosed within perforated or porous tubes.

The perforated or porous tubes before referred to have in the past been made of slitted ebonite but many attempts have been made to provide improved tubes having improved performance and/or lower cost of production. It has been proposed to make the tubes of woven material using yarns of such material as thermoplastic resins, glass and other acid resisting fibres. It has been found, however, that such tubes lack stiffness and their cross section may change during manufacture which can seriously affect the utility of the tubes. It has also been proposed to enclose the woven or braided tubes within outer supporting tubes which may be made of slitted or perforated ebonite or other material. This adds to the cost of the plates and reduces their electrical efficiency.

The requirements to be met in the tubes of tubular plates as aforesaid when such tubes are made of fabric can be summarised as follows:

(a) The fabric tube should not be expensive but be extremely resistant to both acid and oxidation.

(b) The fabric tube should allow very ready diffusion of acid through its pores and interstices.

(c) The tube, though complying with condition (b) should oppose maximum resistance to the tendency of active material to silt out therethrough during the service life of the accumulator.

(d) The tube should be in a form stiff enough for convenient filling with active material by the well-established shaking process.

The object of the present invention is to provide improved fabric tubes for tubular type plates of electric accumulators which meet the requirements above set out.

In accordance with the present invention, the tubes are woven or knitted of a yarn formed from a polyester resin of terephthalic acid and ethylene glycol which is inherently resistant to chemical degradation in a very high degree, has high tensile strength and has true elasticity with a high elongation at the breaking stress. The tubes may be impregnated with a natural or synthetic resin which is cured or set whilst the tubes are on suitable mandrels. The resulting tubes are thus made rigid to a degree sufficient for manufacture, they can be made accurately to the required dimensions and they have the necessary dimensional stability. The material of which the tubes are made, has a high tensile strength, will retain its tubular shape in service under the bursting or hoop stresses occurring during charge-and-discharge cycling, whether the cloth is stiffened with resin or not. In consequence, a resin can be used which is subsequently leached out as soon as the plates containing the tubes made contact with the acid of the accumulator. We prefer to use for this purpose the resin urea formaldehyde because, though normally it is inadvisable to introduce nitrogen containing materials into an accumulator, we find that the nitrogen in urea formaldehyde resin is converted by the acid in the accumulator into innocuous derivatives of ammonia during the cycle of charge-and-discharge of the accumulator.

The accompanying explanatory drawings show the type of tubular plate for an electric accumulator to which this invention relates.

Figure 1 is a view of part of a tubular plate and Figure 2 a view showing the tubular member which surrounds the active material and metal conducting spines between the top and bottom bars of the plate.

The top and bottom bars of the plate are lettered $a$ and $b$ respectively, the spine shown is lettered $c$, the active material around the spine $c$ and within the tube $d$ is lettered $e$. The row of tubes form part of a one-piece woven or knitted structure as shown in Figure 2.

In order to achieve the required degree of porosity necessary to allow free diffusion of acid through the tubes, which is so essential for a high degree of ultilisation of the active material, we may use an open weave, in which case the fabric may be impregnated with resin without any serious loss of permeability. Alternatively, we may use a close weave and maintain a high degree of permeability by using a binding agent to stiffen the tubes during manufacture, said binding agent being of a type soluble in the battery electrolyte. The latter course is advantageous in giving improved retention of the active material and may beneficially be used in conjunction with a "bulked yarn" which enhances the overall porosity of the cloth. The bulked yarns are characterised by the introduction of a so-called "false twist." An example of a bulked yarn eminently suitable for the purpose of this invention is prepared by a process known as the "Taslan" process in which small loops are produced in each of the individual filaments of a polyfilament yarn and these allow the cloth to be woven closely yet with a high degree of intrinsic porosity in the yarn itself and with partial closure of the interstices in the weave by the fluffed out minute loops. In order to achieve the greatest degree of free diffusion of acid when using these bulked polyfilament yarns, it is desirable that the stiffening resins should be of the fugitive type such as urea formaldehyde as where a permanent resin is used for protective purposes, most of the interstices between the individual filaments of the bulked yarn may be completely sealed by the cured film of resin.

In order to restrict the tendency of the active material to silt through the tubes, the cloth should be constructed so as to afford the maximum retention of active material, whilst allowing well distributed diffusion of acid. To this end, cloths of open weave may be constructed of yarns of fairly coarse cross section so that the weave has a basket-like nature in order that active material must follow a labyrinthine path before it can escape from the retaining tube; for example using a coarse 300 denier yarn, 40 yarns per inch of cloth results in an open weave which is yet sufficiently retentive. Alternatively a much closer weave may be used so that the interstices between the yarns are sufficiently small in themselves to restrict the passage of the particles of active material. In this case it is advantageous that the stiffening resin used should be of an acid soluble nature as before described.

In order further to improve the cloth used in the manufacture of the tubes, the yarn may be of a continuous filament type, which have greater strength than staple or discontinuous filament yarns relative to their bulk.

Each tube may be woven or knitted individually or a row of tubes may be produced in a single weaving or like operation, the tubes being interconnected by a small width of fabric. If desired part of each of the two outer tubes forming the two edges of the plate may be woven more closely than the remainder of the tubes whether single or conjoined in order to reduce the porosity at such positions and thus counter the risk of edge short circuits.

Tubes, whether single or multiple, manufactured in the manner herein described can be made with substantially thinner walls, perhaps one-third the thickness of the walls of tubes at present in commercial use in plates for lead-acid batteries, which is a considerable advantage in allowing more effective use to be made of the volume at the disposal of the battery designer. They have the further advantage that they are also much less costly than the tubes or tubular constructions now in common use.

Tubes or multi-tubular assemblies as before described may be threaded on to the per-cast spines and the active material in the form of powder be readily and conveniently filled and compacted into the annular spaces between spines and tubes.

I claim:

1. A tubular type plate for a lead acid electric accumulator, metallic spines extending between top and bottom bars of the plates, active material around the spines and porous tubes surrounding the active material, the tubes formed from an interwoven fabric made from yarn formed from a polyester resin of terephthalic acid and ethylene glycol.

2. A tubular type plate for a lead acid electric accumulator, metallic spines extending between top and bottom bars of the plates, active material around the spines and porous tubes surrounding the active material, the tubes formed from an interwoven fabric made from yarn formed from a polyester resin of terephthalic acid and ethylene glycol, the tubes being resistant to acid and oxidation, permitting diffusion of acid through its pores and interstices while resistant to the tendency of active material to silt out therethrough.

3. The accumulator of claim 1, in which the tubes are impregnated with a resin that is soluble in the electrolyte of the accumulator and without affecting the performance of the accumulator.

4. The accumulator of claim 3, in which the resin is urea formaldehyde.

5. The accumulator of claim 1, in which the yarn used is continuous filament yarn.

6. The accumulator of claim 1, in which the yarn used is bulked yarn.

References Cited in the file of this patent

UNITED STATES PATENTS

| | | |
|---|---|---|
| 2,176,428 | Kershaw | Oct. 17, 1939 |
| 2,204,859 | Hyatt et al. | June 18, 1940 |
| 2,305,121 | Wheat | Dec. 15, 1942 |
| 2,343,970 | Galloway | Mar. 14, 1944 |
| 2,420,456 | White | May 13, 1947 |
| 2,497,376 | Swallow et al. | Feb. 14, 1950 |

FOREIGN PATENTS

| | | |
|---|---|---|
| 757,102 | Great Britain | Sept. 12, 1956 |